United States Patent
Ehlers et al.

(10) Patent No.: US 9,422,056 B2
(45) Date of Patent: Aug. 23, 2016

(54) AIRCRAFT MONUMENT HAVING A SANITARY MODULE AND A GALLEY MODULE

(71) Applicant: Airbus Operations GmbH, Hamburg (DE)

(72) Inventors: Bernd Ehlers, Hamburg (DE); Carsten Putensen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 129 days.

(21) Appl. No.: 14/170,017

(22) Filed: Jan. 31, 2014

(65) Prior Publication Data

US 2014/0217239 A1 Aug. 7, 2014

Related U.S. Application Data

(63) Continuation of application No. PCT/EP2012/003331, filed on Aug. 3, 2012.

(60) Provisional application No. 61/514,922, filed on Aug. 4, 2011.

(30) Foreign Application Priority Data

Aug. 4, 2011 (DE) .................. 10 2011 109 390

(51) Int. Cl.
*B64D 11/00* (2006.01)
*B64D 11/02* (2006.01)
*B64D 11/04* (2006.01)

(52) U.S. Cl.
CPC ........... *B64D 11/02* (2013.01); *B64D 11/0007* (2013.01); *B64D 11/04* (2013.01); *B64D 2011/0046* (2013.01)

(58) Field of Classification Search
CPC ... B64D 11/02; B64D 11/04; B64D 11/0007; B64D 2011/0046
See application file for complete search history.

(56) References Cited

U.S. PATENT DOCUMENTS

| | | | |
|---|---|---|---|
| 8,232,670 B2* | 7/2012 | Breit et al. ..................... 307/9.1 |
| 8,469,311 B2* | 6/2013 | Saint-Jalmes et al. .... 244/118.5 |
| 9,120,573 B2* | 9/2015 | Ehlers ................ B64D 11/0007 |
| 2008/0001031 A1 | 1/2008 | Doebertin et al. |
| 2009/0242699 A1 | 10/2009 | Wentland et al. |
| 2009/0261200 A1 | 10/2009 | Saint-Jalmes et al. |

(Continued)

FOREIGN PATENT DOCUMENTS

| | | |
|---|---|---|
| CN | 1756696 | 4/2006 |
| DE | 102006023047 | 11/2007 |

(Continued)

OTHER PUBLICATIONS

Chinese Search Report, Feb. 3, 2015.

(Continued)

*Primary Examiner* — Philip J Bonzell
(74) *Attorney, Agent, or Firm* — Greer, Burns & Crain, Ltd.

(57) ABSTRACT

An aircraft monument for installation in an aircraft cabin comprising a sanitary module having a sanitary fitment, and a galley module arranged adjacent to the sanitary module. The galley module comprises a trolley parking place and a work surface. The trolley parking place is separated from the sanitary module by a partition wall.

10 Claims, 3 Drawing Sheets

(56) References Cited

U.S. PATENT DOCUMENTS

2010/0193629 A1  8/2010  Breit et al.
2013/0082140 A1* 4/2013  Ehlers ................ B64D 11/0007
                                                   244/118.5

FOREIGN PATENT DOCUMENTS

| | | |
|---|---|---|
| DE | 102007009500 | 8/2008 |
| DE | 102010012989 | 9/2011 |
| EP | 0850833 | 7/1998 |
| EP | 2213571 | 8/2010 |
| JP | 2008239036 | 10/2008 |
| WO | 2010120811 | 10/2010 |
| WO | 2011035845 | 3/2011 |
| WO | 2011116982 | 9/2011 |

OTHER PUBLICATIONS

German Examination Report, Aug. 4, 2011.
International Search Report, Nov. 20, 2012.

* cited by examiner

AIRCRAFT MONUMENT HAVING A SANITARY MODULE AND A GALLEY MODULE

CROSS-REFERENCES TO RELATED APPLICATIONS

This application is a continuation of International Application PCT/EP2012/003331 filed Aug. 3, 2012, designating the United States and published on Feb. 7, 2013 as WO 2013/017290. This application also claims the benefit of the U.S. Provisional Application No. 61/514,922, filed on Aug. 4, 2011, and of the German patent application No. 10 2011 109 390.0 filed on Aug. 4, 2011. The entire disclosures of the above are incorporated herein by way of reference.

BACKGROUND OF THE INVENTION

The invention relates to an aircraft monument provided for installation in an aircraft cabin and comprising a sanitary module and a galley module. Furthermore, the invention relates to an aircraft region comprising such an aircraft monument.

Modern commercial aircraft are usually equipped with galleys with full galley functionality. An aircraft galley is described, for example, in DE 10 2006 023 047 A1. On short-haul flights of the low cost segment, however, the passengers are frequently offered only a reduced service, that is to say just drinks and/or small snacks are distributed to the passengers. The drinks and/or snacks to be served to the passengers can be accommodated in a few trolleys. Galleys equipped with ovens, cool boxes, drink preparation appliances and sufficient stowage space for accommodating trolleys filled with a variety of service products are unnecessary for providing this reduced service.

In this connection, the non-prior-published DE 10 2010 012 989 proposes equipping in its interior a sanitary module, provided for installation in an aircraft cabin, with a first trolley parking place for accommodating in the interior of the sanitary module at least one trolley suitable for receiving supply goods for the passengers in the aircraft cabin. Furthermore, a second trolley parking place is provided adjacent to the sanitary module. During takeoff and landing, i.e. during the flight phases in which the sanitary module is not available for use by the passengers for safety reasons anyway, the first trolley parking place in the interior of the sanitary module can be utilized for accommodating one or more trolleys. When the aircraft is at cruising altitude, by contrast, the second trolley parking place is available for accommodating the trolley(s).

SUMMARY OF THE INVENTION

The object on which the invention is based is to specify an aircraft monument which enables reduction of the installation space requirement of a galley in an aircraft cabin without making it more difficult for the cabin crew to handle trolleys filled with service products. Furthermore, the object on which the invention is based is to provide an aircraft region equipped with such an aircraft monument.

An aircraft monument provided for installation in an aircraft cabin comprises a sanitary module and a galley module arranged adjacent to the sanitary module. The sanitary module has a sanitary fitment, such as for example a toilet, which is preferably arranged in an interior of the sanitary module. Furthermore, a washbasin with a water tap, a mirror and/or a cabinet for accommodating toilet paper, paper handkerchiefs or the like may be provided in the interior of the sanitary module.

The galley module comprises a trolley parking place and a work surface. The trolley parking place serves for accommodating in the galley module at least one trolley suitable for receiving supply goods for the passengers in the aircraft cabin. When the aircraft monument is mounted in an aircraft cabin, the work surface preferably extends substantially parallel to a cabin floor and, when the aircraft is at cruising altitude, can be utilized by the cabin crew for preparing snacks or drinks. Furthermore, the work surface can be utilized, in particular when the aircraft is on the ground, for offering the passengers newspapers, magazines or small presents, for example, as they enter or leave the aircraft.

Preferably, when the aircraft monument is mounted in an aircraft cabin, the work surface forms an upper boundary, extending substantially parallel to the cabin floor, of the trolley parking place. Through the trolley parking place and the work surface, the galley module of the aircraft monument according to the invention is adequately equipped for providing the reduced services arising on short-haul flights of the low cost segment. The installation of aircraft galleys with full galley functionality in the aircraft cabin can thereby be dispensed with, so that the installation space saved for the aircraft galleys can be utilized, for example, for the installation of additional seats.

The trolley parking place is separated from the sanitary module by a partition wall. The partition wall separating the trolley parking place from the sanitary module may be formed by a region, adjoining the trolley parking place, of a side wall of the sanitary module. Despite the particularly installation-space-saving combination of a sanitary module with a galley module, a clear separation between the sanitary module and the food-containing trolleys is created by the partition wall in the aircraft monument according to the invention. The trolleys can remain in the trolley parking place of the galley module in all operating phases of the aircraft, as long as they are not required for distributing service products to the passengers. Additional effort due to repositioning the trolleys depending on the operating phase of the aircraft can thereby be avoided.

The galley module of the aircraft monument according to the invention preferably furthermore comprises a receiving region, which is arranged, when the aircraft monument is installed in an aircraft cabin, at a distance from the work surface in the direction of an aircraft cabin ceiling. The receiving region, which can be utilized for example as a stowage space or for installing equipment to be mounted in the aircraft cabin, is preferably arranged in a similar position to an upper cabinet in a conventional aircraft galley. It is to be ensured here that the distance of the receiving region from the work surface is chosen such that the utilization of the work surface is not restricted by the receiving region. The receiving region is preferably separated from the sanitary module by a partition wall, just like the trolley parking place of the galley module, in which case the partition wall separating the receiving region of the galley module from the sanitary module may be formed by a side wall region, adjoining the receiving region, of the sanitary module.

The aircraft monument may have a substantially L-shaped plan. For example, the sanitary module may then occupy a first, long leg of the L-shaped plan of the aircraft monument. The galley module, i.e. in particular the trolley parking place of the galley module, may then extend substantially perpendicularly to the sanitary module and occupy a second, short leg of the L-shaped plan of the aircraft monument.

Furthermore, the galley module itself may also have a substantially L-shaped plan. The trolley parking place may then occupy a first leg of the L-shaped plan of the galley module. A further receiving region of the galley module may extend from the trolley parking place, which region has a reduced width compared with the trolley parking place and thereby forms a second leg of the substantially L-shaped plan of the galley module. In the case of such a configuration of the galley module, when the aircraft monument is mounted in an aircraft cabin, the work surface preferably forms not only an upper boundary, extending substantially parallel to the cabin floor, of the trolley parking place, but also an upper boundary, extending substantially parallel to the cabin floor, of the further receiving region.

The upper receiving region, arranged at a distance from the work surface, of the galley module in the direction of an aircraft cabin ceiling is then preferably designed such that its width corresponds to the width of the further receiving region. Preferably, however, the upper receiving region of the galley module has at least a smaller width than the trolley parking place.

In a preferred embodiment of the aircraft monument according to the invention, the galley module furthermore comprises a drink preparation device which is provided with a water connection system for supplying the drink preparation device with water. The drink preparation device may be a drink preparation device suitable for preparing tea or coffee, but also a drink preparation device for preparing cold drinks. The water connection system of the drink preparation device is preferably connected to a water supply system of the sanitary module for supplying the sanitary fitment with water. Preferably, the drink preparation device furthermore comprises a wastewater connection system for disposing of wastewater produced by the drink preparation device. The wastewater connection system of the drink preparation device may be connected to a wastewater disposal system of the sanitary module for disposing of wastewater produced by the sanitary fitment.

In the aircraft monument according to the invention, water pipe systems of the sanitary module which are already present can thus be utilized for supplying the drink preparation device of the galley module with water and for disposing of wastewater produced by the drink preparation device, respectively. Furthermore, it is conceivable to connect a water tap and/or a washbasin of the galley module to a water supply system of the sanitary module and a wastewater disposal system of the sanitary module, respectively.

Furthermore, the galley module may comprise a galley appliance. The galley appliance may be an above-described drink preparation device, but also another galley appliance, such as for example an oven or the like. The galley appliance preferably comprises an electrical connection system for supplying the galley appliance with electrical energy, which system is connected to an electrical supply system of the sanitary module. The electrical supply system of the sanitary module serves, for example, to supply lighting elements or the like, provided in the sanitary module, with electrical energy. The aircraft monument according to the invention thus allows an already present electrical supply system of the sanitary module to be utilized for supplying the galley appliance of the galley module with electrical energy.

The drink preparation device and/or the galley appliance is/are preferably arranged in the region of a surface, facing the galley module, of a side wall of the sanitary module. Such a design of the aircraft monument according to the invention allows simple connection of the water connection system, the wastewater connection system and/or the electrical connection system of the drink preparation device and/or the galley appliance to the water supply system, the wastewater disposal system and/or the electrical supply system of the sanitary module. If desired, the surface, facing the galley module, of the sanitary module side wall may be provided with a recess for receiving the drink preparation device and/or the galley appliance.

An aircraft region according to the invention has an aisle, which extends in the direction of an aircraft door and via which passengers are able to get on or off the aircraft. Furthermore, the aircraft region comprises an above-described aircraft monument comprising a sanitary module and a galley module, the galley module of the aircraft monument adjoining the aisle in such a manner that the galley module forms, at least over a part of the length of the aisle, one of the lateral boundaries of the aisle. In the case of the configuration of an aircraft region according to the invention, the galley module is positioned in a particularly installation-space-saving manner in an entrance region of the aircraft cabin. The entrance region, which cannot be provided with passenger seats anyway, can then be utilized, when the aircraft is at cruising altitude, by the cabin crew as a work area on utilizing the galley module.

The galley module may extend along the entire length of the aisle from the aircraft door up to a main aisle extending along a longitudinal axis of the aircraft cabin. Alternatively to this, however, the galley module may also be designed such that it forms one of the lateral boundaries of the aisle over only part of the length of the aisle.

In a preferred embodiment of the aircraft region according to the invention, the aircraft monument is designed such that, in a partial region, facing the aircraft door, of the aircraft region, there is formed a recess which is bounded laterally by the aircraft monument and the aisle and which is designed so as to be able to accommodate a standing person completely or at least to a large extent (more than one half of an average adult person's lateral cross section). The design of the recess (which can serve as an assist space) can vary according to requirements. For example, the recess can be designed such that one or more persons standing in the recess do not impede the passengers on entry or exit. This enables the cabin crew, in the event of a panic in which all the passengers are pushing to get out of the aircraft, to position themselves in the recess such that the flow of passengers is led past the cabin crew without dragging them along. Advantageously one or more handles, which the cabin crew can hold onto in the event of a panic, may be provided on the inner side of the recess. Furthermore, a flight attendant can utilize the recess for greeting or saying goodbye, without impeding the passengers. Finally, the recess and/or the passage could be utilized for a pre-flight or post-flight discussion of the crew.

The plan of the recess may be of rectangular, triangular, crescent-shaped or any other desired design, according to the particular requirements.

Preferably, the recess is bounded, in a direction facing away from the aircraft door, by the trolley parking place of the galley module. Such an arrangement enables optimal space utilization, since the dimensions of the passage can be reduced to a minimum, while of course complying with the safety standards and the approval requirements.

BRIEF DESCRIPTION OF THE DRAWINGS

Preferred embodiments of the invention are now explained in more detail with reference to the appended schematic drawings, of which.

DETAILED DESCRIPTION OF THE PREFERRED EMBODIMENTS

Figure 1:
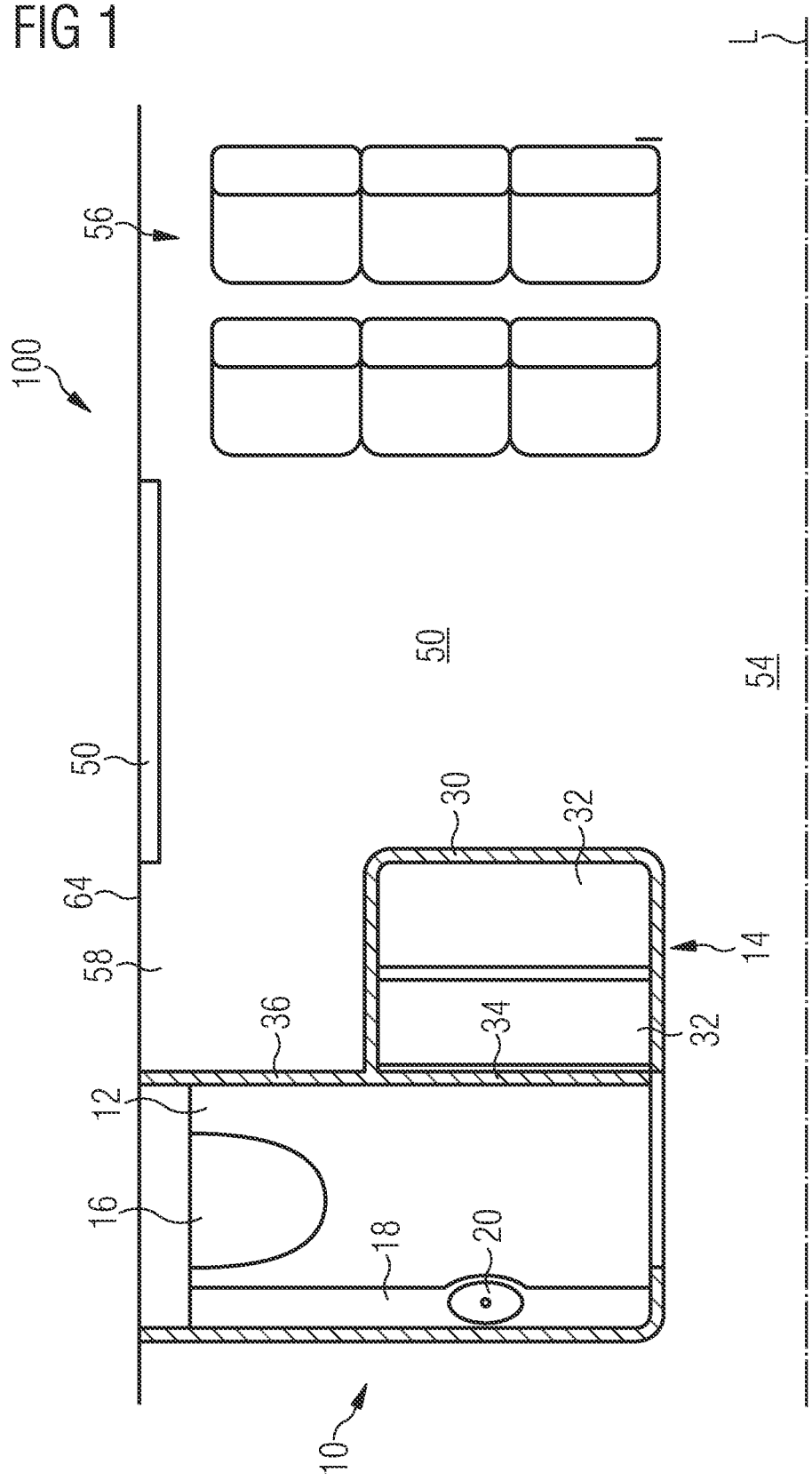
FIG. 1 shows an aircraft region, in which there is installed a first embodiment of an aircraft monument having a sanitary module and a galley module.

FIG. 1 shows a plan view of an aircraft region 100, in which there is installed a first embodiment of an aircraft monument 10. The aircraft monument 10 comprises a sanitary module 12 and a galley module 14 arranged adjacent to the sanitary module 12. A toilet 16 and a cabinet 18 are situated in the interior of the sanitary module 12. A washbasin 20 and a water tap 22 are integrated into the cabinet 18. Furthermore, a lighting element 24 is provided.

Figure 3:
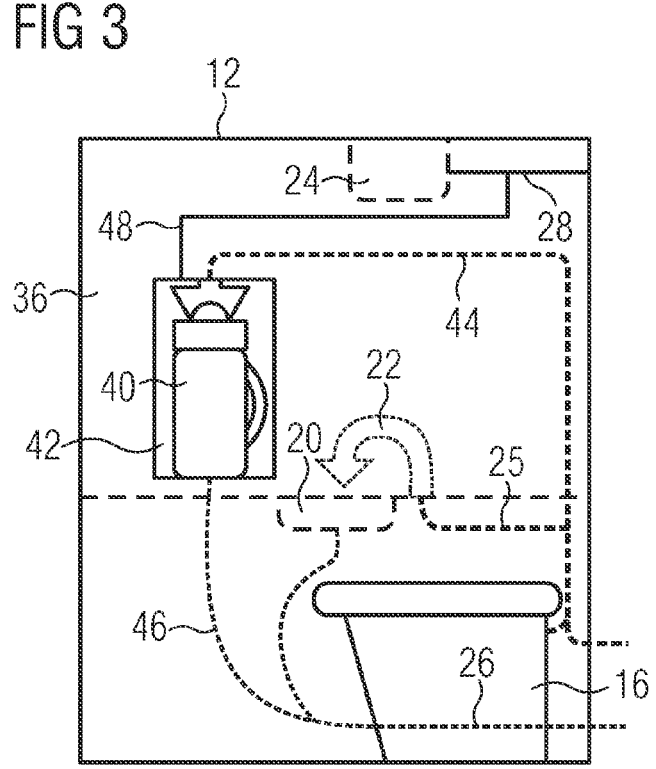
FIG. 3 shows a view of the aircraft monument according to FIG. 1, in which the supply systems of the sanitary module are illustrated, in particular.

As can be seen from FIG. 3, the sanitary module 12 comprises a water supply system 25, which serves to connect the water tap 22 and the toilet 16 to a central water supply system of the aircraft. Furthermore, a wastewater disposal system 26 is present, which serves to connect the washbasin 20 and the toilet 16 to a central wastewater disposal system of the aircraft. Finally, an electrical supply system 28 is present, which serves to connect the lighting element 24 to a central electrical supply system of the aircraft.

The galley module 14 arranged adjacent to the sanitary module 12 comprises a trolley parking place 30. In the embodiment of an aircraft monument 10 illustrated in FIGS. 1 to 3, the trolley parking place 30 is dimensioned such that two trolleys 32, filled for example with service products for the passengers on board an aircraft, can be accommodated in the trolley parking place. The trolley parking place 30 is separated from the sanitary module 12, i.e. the interior of the sanitary module, by a partition wall 34. The partition wall 34 is formed by a region, adjoining the trolley parking place 30, of a side wall 36 of the sanitary module 12.

Figure 2:
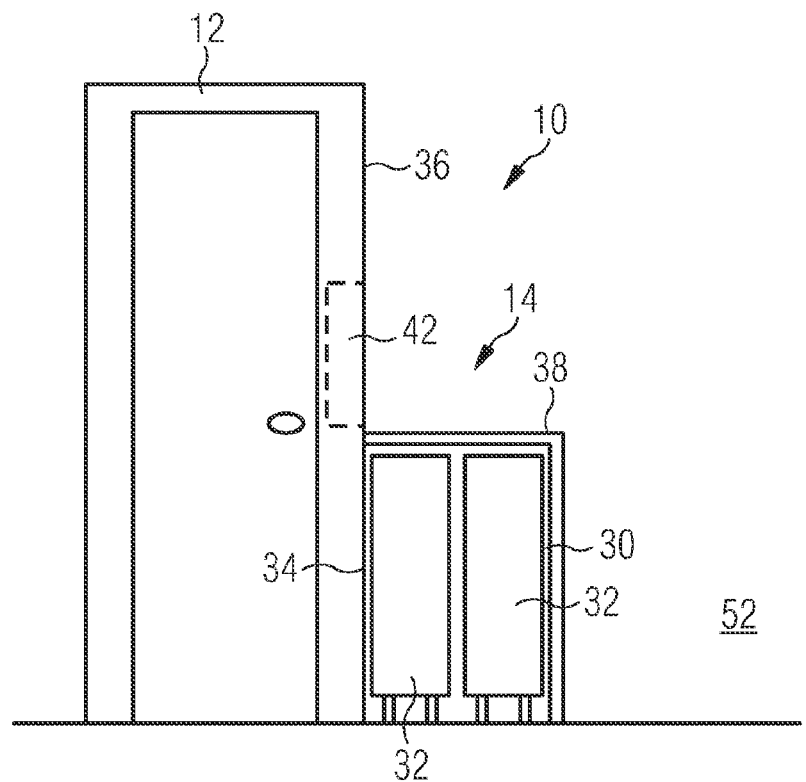
FIG. 2 shows a front view of the aircraft monument according to FIG. 1.

The galley module 14 furthermore comprises a work surface 38, which extends parallel to a cabin floor, when the aircraft monument 10 is mounted in an aircraft cabin as illustrated in FIGS. 1 to 3. The work surface 38 can be utilized by the cabin crew for preparing snacks or drinks when the aircraft is at cruising altitude. The work surface 38 forms an upper boundary, extending substantially parallel to the cabin floor, of the trolley parking place 30 and also does not extend beyond the trolley parking place 30 in the arrangement according to FIGS. 1 to 3.

Finally, the galley module 14 comprises a drink preparation device 40 for preparing tea or coffee. The drink preparation device 40 is arranged in a recess 42, which is formed in the region of a surface, facing the galley module 14, of the side wall 36 of the sanitary module 12. As can be seen from FIG. 3, the drink preparation device 40 comprises a water connection system 44, which is connected to the water supply system 25 of the sanitary module 12 in order to supply the drink preparation device 40 with fresh water. Furthermore, a wastewater connection system 46 of the drink preparation device 40 is connected to the wastewater disposal system 26 of the sanitary module 12. Finally, the drink preparation device 40 is connected to the electrical supply system 28 of the sanitary module 12 via an electrical connection system 48.

In the arrangement illustrated in FIGS. 1 to 3, the aircraft monument 10 has overall an L-shaped plan, the sanitary module 12 forming a long leg, from which the trolley parking place 30 of the galley module 14 extends substantially perpendicularly. The aircraft region 100 in which the aircraft monument 10 is installed in the aircraft cabin has an aisle 52, which extends in the direction of an aircraft door 50 and via which passengers are able to get on or off the aircraft. The aisle 52 connects the aircraft door 50 to a main aisle 54 extending substantially along a longitudinal axis of the aircraft cabin. Furthermore, the aisle 52 separates the aircraft monument 10 from a plurality of passenger seats 56. The aircraft monument 10 is arranged in such a manner in the aircraft region 100 that the galley module 14 of the aircraft monument 10 adjoins the aisle 52 and over a part, adjoining the main aisle 54, of the length of the aisle 52 forms one of the lateral boundaries of the passage 52.

Through its L-shaped plan, the aircraft monument 10 is designed such that in a partial region, facing the aircraft door 50, of the aircraft region 100 a recess 58 bounded laterally by the aircraft monument 10 is formed. In the arrangement shown in FIGS. 1 to 3, the recess 58 is bounded laterally by a section of the sanitary module, i.e. a region of the side wall 36 of the sanitary module 12. The recess is designed so as to be able to accommodate a standing person completely or at least to a large extent (more than one half of an average adult person's lateral cross section). In particular, the dimensions of the recess 58 are designed such that a person standing in the recess 58 does not impede the passengers on entry or exit. In a direction perpendicular to the longitudinal axis L of the aircraft cabin, i.e. along the passage 52, the recess 58 is bounded on its side facing away from the aircraft door 50 by the trolley parking place 30 of the galley module 14.

Figure 4:
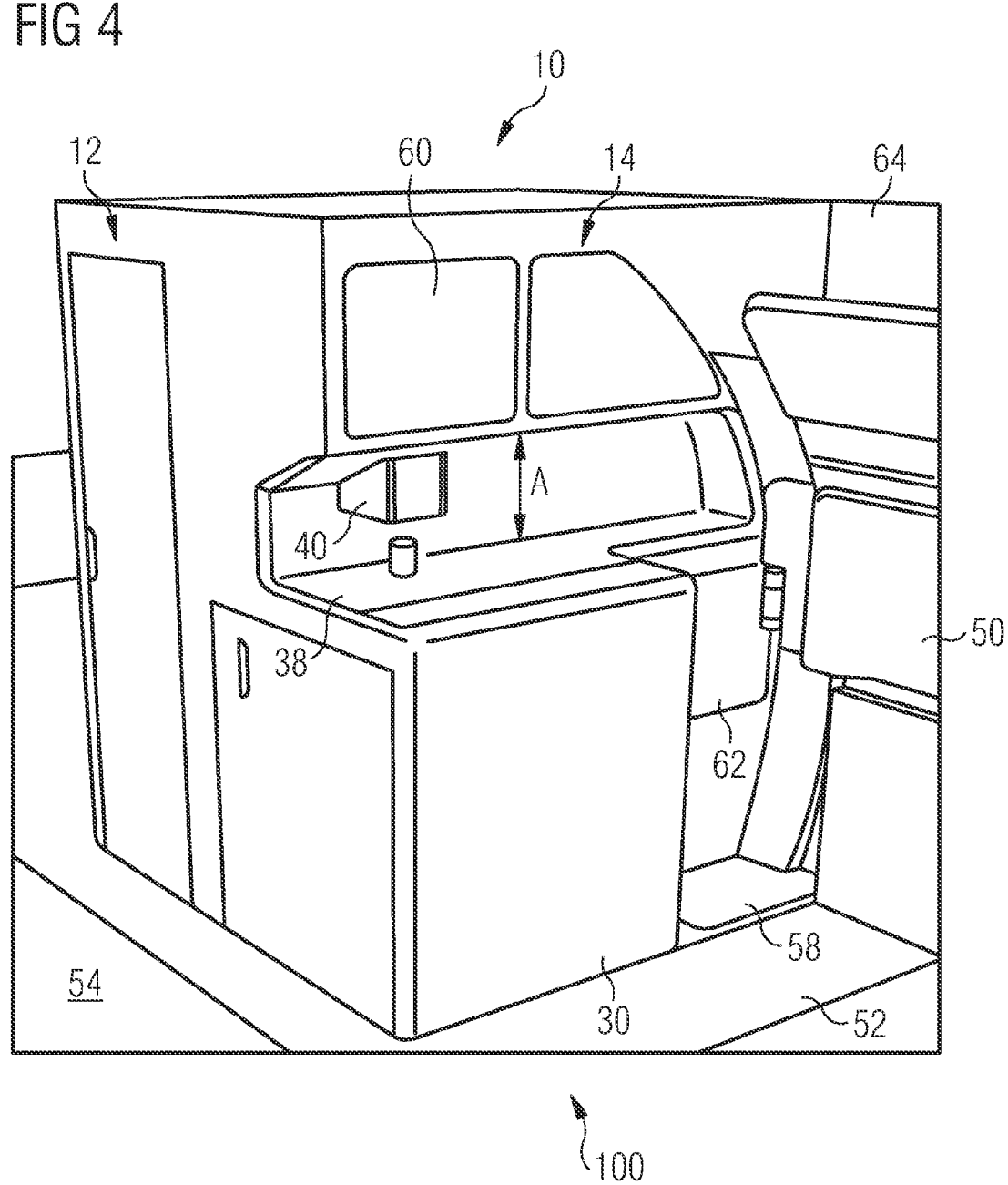
FIG. 4 shows a three-dimensional view of an aircraft region, in which there is installed a second embodiment of an aircraft monument having a sanitary module and a galley module.

FIG. 4 shows a three-dimensional view of an aircraft region 100, in which there is installed a second embodiment of an aircraft monument 10 which likewise comprises a sanitary module 12 and a galley module 14. The aircraft monument 10 illustrated in FIG. 4 differs from the aircraft monument 10 shown in FIGS. 1 to 3 in the design of the galley module 14. In the arrangement according to FIG. 4, the galley module 14 additionally comprises a receiving region 60 which is arranged, in the direction of an aircraft cabin ceiling, at a distance A from the work surface 38 above the work surface 38. In the embodiment shown in FIG. 4, the receiving region 60 is utilized as a stowage space. In a manner similar to the trolley parking place 30, the receiving region 60 is also separated from the sanitary module 12, i.e. the interior of the sanitary module, by a partition wall which is formed by a region, adjoining the receiving region 60, of the side wall 36 of the sanitary module 12.

The drink preparation device 40 of the galley module 14 is no longer integrated into a recess 42 formed in a side wall 36 of the sanitary module 12, but is mounted on the side wall 36 of the sanitary module 12 underneath the receiving region 60. However, the drink preparation device 40 is again arranged above the work surface 38, so that drink cups or the like can be conveniently put down on the work surface 38.

Finally, the galley module 14 comprises a further receiving region 62, which extends between the trolley parking place 30 and a side wall 64 of the aircraft cabin. In the arrangement according to FIG. 4, the recess 58 is therefore bounded by the aisle 52 and the further receiving region 62 of the galley module 14.

The width of the receiving region 60 corresponds to the width of the further receiving region 62, so that the recess 58 is not constricted by the receiving region 60. However, the work surface 38 nevertheless also extends over the further receiving region 62, i.e. the work surface 38 forms not only an upper boundary of the trolley parking place 30, but also an upper boundary of the further receiving region 62. Otherwise, the design and the function of the aircraft region 100 according to FIG. 4 corresponds to the design and the function of the aircraft region 100 illustrated in FIGS. 1 to 3.

It is understood that features which have been described in connection with one embodiment of an aircraft region 100 can also be transferred to the other embodiment of the aircraft region 100, i.e., the features of the two embodiments of an aircraft region 100 described here are interchangeable as desired.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft monument for installation in an aircraft cabin, comprising:
    a sanitary module having a sanitary fitment, the sanitary module having a side wall, and
    a galley module, which is arranged adjacent to the sanitary module and comprises a trolley parking place and a work surface, the trolley parking place being separated from the sanitary module by a partition wall, the partition wall being formed by a first region of the side wall,
    wherein the aircraft monument has a substantially L-shaped plan, wherein the aircraft monument forms a recess which is bounded laterally at least partially by a second region of the side wall and is further bounded by the trolley parking space of the galley module, and
    wherein the aircraft monument is configured to be installed in an aircraft next to an aisle extending from an aircraft door in a direction perpendicular to a longitudinal axis of the aircraft, so that the recess is laterally bounded by the aisle and allows accommodating a standing person completely or at least to a large extent, and wherein the trolley parking place of the galley module forms a boundary of the recess which is opposite a side wall of the aircraft cabin containing the aircraft door.

2. The aircraft monument according to claim 1, wherein the galley module furthermore comprises a receiving region, which is arranged above and at a distance from the work surface.

3. The aircraft monument according to claim 1, wherein the galley module has a substantially L-shaped plan.

4. The aircraft monument according to claim 1, wherein the galley module comprises a drink preparation device, wherein, for supplying the drink preparation device with water, a water connection system of the drink preparation device is connected to a water supply system of the sanitary module for supplying the sanitary fitment with water.

5. The aircraft monument according to claim 4, wherein, for disposing of wastewater produced by the drink preparation device, a wastewater connection system of the drink preparation device is connected to a wastewater disposal system of the sanitary module for disposing of wastewater produced by the sanitary fitment.

6. The aircraft monument according to claim 4, wherein the drink preparation device is arranged in the region of a surface, facing the galley module, of a side wall of the sanitary module.

7. The aircraft monument according to claim 1, wherein the galley module comprises a galley appliance, wherein, for supplying the galley appliance with electrical energy, an electrical connection system of the galley appliance is connected to an electrical supply system of the sanitary module.

8. The aircraft monument according to claim 7, wherein the galley appliance is arranged in the region of a surface, facing the galley module, of a side wall of the sanitary module.

9. An aircraft region for an aircraft, comprising:
    an aisle, which extends from an aircraft door and via which passengers are able to get on or off the aircraft, and
    an aircraft monument for installation in an aircraft cabin next to the aisle, comprising:
    a sanitary module having a sanitary fitment, the sanitary module having a side wall, and
    a galley module, which is arranged adjacent to the sanitary module and comprises a trolley parking place and a work surface, the trolley parking place being separated from the sanitary module by a partition wall, the partition wall being formed by a first region of the side wall,
    the galley module of the aircraft monument adjoining the aisle in such a manner that the galley module forms, at least over a part of the length of the aisle, one of the lateral boundaries of the aisle,
    wherein the aircraft monument has a substantially L-shaped plan, wherein the aircraft monument forms a recess which is bounded laterally at least partially by a second region of the side wall and the aisle and is further bounded by the trolley parking place of the galley module, so that the recess allows accommodating a standing person completely or at least to a large extent, and wherein the trolley parking place of the galley module bounds the recess in a direction facing away from the aircraft door.

10. The aircraft region according to claim 9, wherein the dimensions of the recess are designed such that an adult person standing in the recess does not impede the passengers on entry or exit.

* * * * *